US008246729B2

(12) United States Patent
Defilippi et al.

(10) Patent No.: US 8,246,729 B2
(45) Date of Patent: Aug. 21, 2012

(54) FUEL VAPOUR ADSORBING DEVICE

(75) Inventors: Roberto Defilippi, Turin (IT); Giovanni Del Conte, Collegno (IT)

(73) Assignee: Dytech—Dynamic Fluid Technologies S.p.A., Turin (IT)

( * ) Notice: Subject to any disclaimer, the term of this patent is extended or adjusted under 35 U.S.C. 154(b) by 562 days.

(21) Appl. No.: 12/309,854

(22) PCT Filed: Aug. 3, 2006

(86) PCT No.: PCT/IT2006/000598

§ 371 (c)(1),
(2), (4) Date: Jun. 22, 2009

(87) PCT Pub. No.: WO2008/015706

PCT Pub. Date: Feb. 7, 2008

(65) Prior Publication Data

US 2009/0293727 A1 Dec. 3, 2009

(51) Int. Cl.
*B60K 15/035* (2006.01)
*B01D 53/04* (2006.01)

(52) U.S. Cl. ............................... 96/137; 96/139; 96/149

(58) Field of Classification Search .................. 123/519; 96/134, 135, 137, 139, 149, 152
See application file for complete search history.

(56) References Cited

U.S. PATENT DOCUMENTS

| | | | | |
|---|---|---|---|---|
| 4,693,393 | A * | 9/1987 | DeMinco et al. | 220/374 |
| 4,721,846 | A * | 1/1988 | Lupoli et al. | 219/206 |
| 5,098,453 | A * | 3/1992 | Turner et al. | 96/149 |
| 5,408,976 | A * | 4/1995 | Reddy | 123/519 |
| 6,503,301 | B2 * | 1/2003 | Uchino et al. | 96/132 |
| 6,896,852 | B1 * | 5/2005 | Meiller et al. | 422/180 |
| 6,935,318 | B2 * | 8/2005 | Abidi et al. | 123/519 |
| 7,005,001 | B2 * | 2/2006 | Allen et al. | 96/149 |
| 2002/0059954 | A1 * | 5/2002 | Aoki et al. | 137/202 |
| 2002/0078931 | A1 * | 6/2002 | Makino et al. | 123/519 |
| 2003/0075543 | A1 * | 4/2003 | Hagano | 220/255 |

* cited by examiner

*Primary Examiner* — Frank Lawrence, Jr.

(74) *Attorney, Agent, or Firm* — Davidson Berquist Jackson & Gowdey, LLP

(57) ABSTRACT

A fuel vapor adsorbing device has a casing having an axis and defining a vapor inlet, a vent connected to the outside environment, and a chamber connected fluidically to the inlet and the vent. The adsorbing device also includes a filter material housed in the chamber; a cover wall covering the chamber; and an elastic mechanism and, preferably, a grille, which are integral with the cover wall and cooperate with the filter material.

10 Claims, 2 Drawing Sheets

FUEL VAPOUR ADSORBING DEVICE

TECHNICAL FIELD

The present invention relates to a fuel vapour adsorbing device, or canister, for a motor vehicle tank.

BACKGROUND ART

Canisters are known comprising a casing defining a chamber; and a filter housed inside the chamber and comprising bulk granules of adsorbent material, such as active carbon. More specifically, the casing defines an inlet for fuel vapour from the tank; an outlet communicating with the outside environment; and a hatch connected to the intake manifold of an internal combustion engine of the vehicle to perform cleaning cycles of the active carbon.

An active-carbon canister normally also comprises a grille cooperating with the active carbon; and elastic means interposed between a cover of the canister and the grille to compact the active carbon and prevent the granules from being damaged by stress during normal use of the vehicle, e.g. by jolting when running along uneven roads.

An adsorbing device according to the preamble of claim 1 is disclosed in U.S. Pat. No. 4,693,393.

Assembling the cover, the elastic means, and the grille, however, involve a relatively large number of operations, which increase manufacturing time.

DISCLOSURE OF INVENTION

It is an object of the present invention to provide a canister designed to eliminate the above drawback.

According to the present invention, there is provided a canister as claimed in claim 1.

BRIEF DESCRIPTION OF THE DRAWINGS

A preferred embodiment of the present invention will be described by way of example with reference to the accompanying drawings, in which.

BEST MODE FOR CARRYING OUT THE INVENTION

Figure 1:
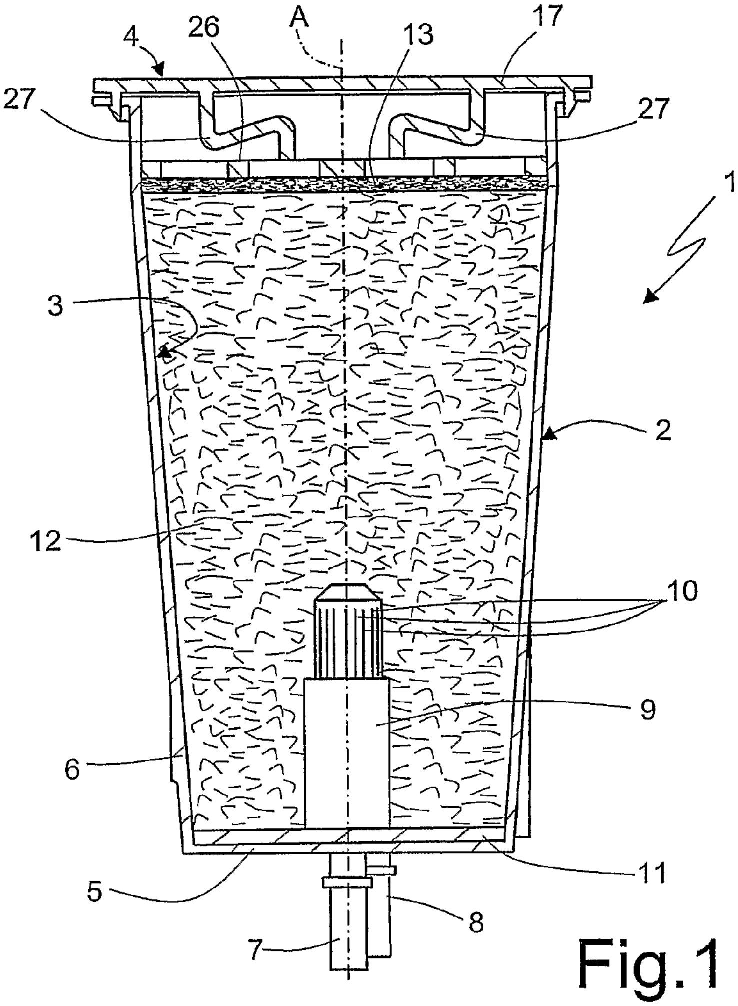
FIG. 1 shows a longitudinal section of a canister in accordance with the present invention.

Number 1 in FIG. 1 indicates as a whole a canister comprising a casing 2 defining a chamber 3; and a cover 4 connected to casing 2 to close chamber 3.

More specifically, casing 2 is truncated-cone-shaped, and comprises, integrally, a bottom wall 5, a lateral wall 6 axially symmetrical with respect to an axis A, and two tubular projections 7 and 8 projecting from bottom wall 5 on the opposite side of bottom wall 5 to lateral wall 6.

Tubular projections 7 and 8 respectively define an inlet 7 and an outlet 8 connecting chamber 3 fluidically to a fuel tank (not shown) and to an intake manifold (not shown) of an internal combustion engine respectively.

Canister 1 also comprises a diffuser 9 connected fluidically to the inlet and housed inside chamber 3.

Diffuser 9 is tubular, and defines a number of openings 10 located at a predetermined axial height to diffuse the gas mixture inside chamber 3.

Canister 1 also comprises a first felt 11 resting on bottom wall 5; an adsorbent material 12, e.g. granular active carbon, housed in chamber 3, on top of felt 11; and a second felt 13 interposed between adsorbent material 12 and cover 4.

Figure 2:
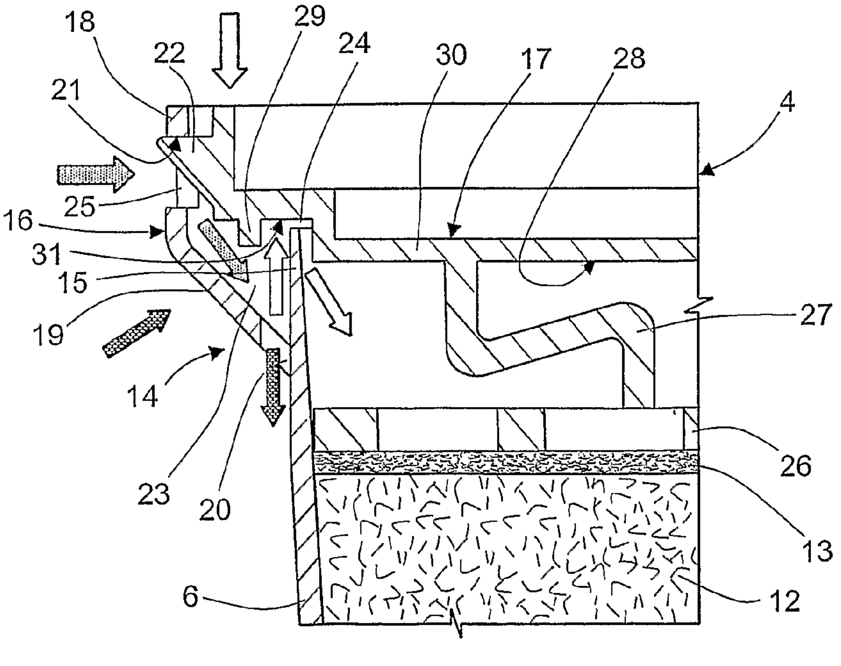
FIG. 2 shows a section of a preferred embodiment of a detail in FIG. 1.

FIG. 2 shows an end portion 14 of casing 2 in accordance with a preferred embodiment. More specifically, end portion 14 is located at the opposite axial end to bottom wall 5, and defines a labyrinth seal.

The labyrinth seal preferably comprises an end portion 15 of lateral wall 6; an annular member 16 surrounding end portion 15; and a cover wall 17 of cover 4.

More specifically, annular member 16 comprises, integrally, a cylindrical wall 18 coaxial with axis A and larger in diameter than end portion 15; and a sloping wall 19 converging with and forming one piece with lateral wall 6.

Sloping wall 19 defines, together with end portion 15, a number of passages 20; and cylindrical wall 18 defines a number of openings 21 cooperating with respective radial projections 22 on cover 4 to define a click-on fastener.

When cover 4 is positioned closing casing 2, a gap 23 is conveniently defined by end portion 15, annular member 16, and cover wall 17.

When cover 4 is in the closed position, gap 23 communicates fluidically with the outside environment through passages 20, and with chamber 3 through a relief passage 24 defined between end portion 15 and cover wall 17 and located axially higher than passages 20.

Moreover, each opening 21 is axially larger than relative radial projection 22 to define a passage 25 connecting gap 23 to the outside environment.

Casing 2 is preferably made of polymer material and molded in one piece.

Figure 3:
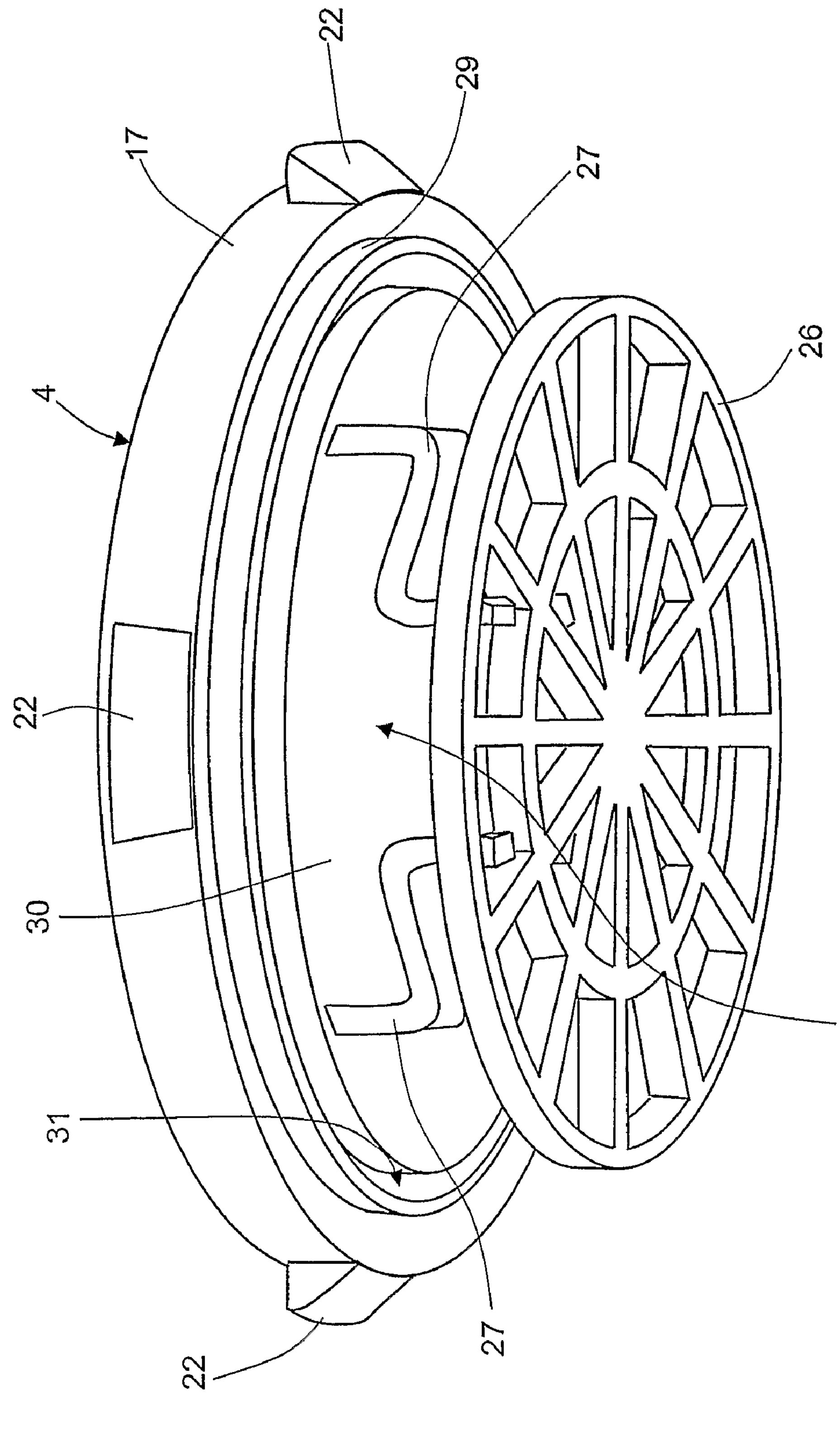
FIG. 3 shows a view in perspective of a cover of the FIG. 1 canister.

FIG. 3 shows cover 4, which comprises, integrally, cover wall 17; radial projections 22 on cover wall 17; a grille 26 cooperating with felt 13; and two elastic members 27 interposed between cover wall 17 and grille 26 to compact adsorbent material 12 when cover 4 is closed.

More specifically, elastic members 27 are axially symmetrical with respect to axis A, and each comprise a straight, substantially S-shaped wall (FIG. 2) having end portions connected to cover wall 17 and grille 26 respectively.

Cover wall 17 preferably has a face 28 facing grille 26 and defining an annular wall 29 and a cylindrical projection 30 concentric with annular wall 29.

More specifically, annular wall 29 has an inside diameter larger than the outside diameter of end portion 15, and defines, with cylindrical projection 30, a groove 31 housing end portion 15 both axially and radially loosely to define passage 24 when cover 4 is closed onto casing 2.

When assembling canister 1, felt 11 is placed on bottom wall 5, and the active carbon is deposited on felt 11 to prevent it escaping from tubular projections 7 and 8.

Felt 13 is then applied, and cover 4 is closed onto casing 2 by the click-on fastener defined by radial projections 22 and openings 21. In the closed position, cover 4 is maintained at such an axial height that elastic members 27 are compressed and exert, by means of grille 26 and felt 13, substantially uniform pressure to compact the active carbon.

Cover 4 and, in particular, cover wall 17, elastic members 27, and grille 26 are preferably made of polymer material and molded in one piece.

Canister 1 operates as follows.

An air-vapour mixture from the vehicle tank flows into chamber 3 through tubular projection 7 and openings 10 in diffuser 9, at a roughly intermediate height with respect to the active-carbon level inside casing 2.

Active carbon 12 retains the fuel vapour and allows the air, containing no fuel vapour, to flow out through felt 13, grille 26, and passage 24 into the outside environment.

More specifically, felt 13 retains the active carbon inside chamber 3, and prevents particles from escaping through passage 24 into the outside environment.

During the cleaning cycle, the vacuum created by the intake manifold and the force of gravity draw outside air through passage 24 and force the fuel vapour to the outlet defined by tubular projection 8.

The air flowing in through passage 24 during the cleaning cycle may contain particles of water or impurities. In which case, the particles flow into gap 23 through passage 25, but, being heavier than air, flow out by gravity through passages 20, whereas the air, containing substantially no particles, flows up to passage 24 and eventually into chamber 3.

The advantages of canister 1 according to the present invention are as follows.

Elastic members 27 formed integrally with cover 4 eliminate several assembly operations, and reduce both manufacturing time and the number of component parts of canister 1.

Click-on connection of cover 4 to casing 2 eliminates the need for laser or vibration welding and the high-cost equipment involved, and also further reduces assembly time by eliminating the testing operation required by laser or vibration welded covers.

The labyrinth seal defined at end portion 14 is an effective, compact barrier preventing water particles from entering canister 1.

More specifically, the fact that passage 24 is defined between cover 4 and end portion 15 of lateral wall 6, that projections 22 directly engage annular member 16, and that passages 25 are defined by openings 21, are all design solutions which simplify the geometry of the component parts and assembly, and avoid back drafts in the molds.

The above are also achieved by virtue of passage 24 being defined between cover 4 and casing 2.

Clearly, changes may be made to canister 1 as described and illustrated herein without, however, departing from the scope of the present invention as defined in the accompanying Claims.

Canister 1 need not have the labyrinth seal shown in FIG. 2. In this simplified embodiment (FIG. 1), cover 4 clicks onto a flange 32 integral with end portion 15 of lateral wall 6, and passage 24 is defined between flange 32 and cover wall 17.

Felt 13 may be glued to grille 26 to further simplify assembly.

Grille 26 may be separate from elastic members 27, and only cover wall 17 and elastic members 27 may be formed in one piece.

The invention claimed is:

1. A fuel vapour adsorbing device comprising a casing having an axis (A) and defining a vapour inlet, a vent connected to the outside environment, an outlet, and a chamber connected fluidically to said inlet, said outlet, and said vent, a filter material housed in said chamber; a cover wall covering said chamber; and an elastic mechanism cooperating with said filter material and being integral with said cover wall and configured to compact said filter material, wherein said vent is defined between said casing and said cover wall.

2. The adsorbing device as claimed in claim 1, further including a labyrinth seal connected fluidically to said vent.

3. The adsorbing device as claimed in claim 2, wherein said labyrinth seal comprises an axial end portion of said casing, and an annular member of said casing defining a gap with said end portion; said gap being connected fluidically with the outside environment, with said vent, and with at least one aperture located at an axial height lower than that of said vent.

4. The adsorbing device as claimed in claim 1, further including click-on connector interposed between said cover wall and said casing.

5. The adsorbing device as claimed in claim 2, wherein said cover wall defines a portion of said labyrinth seal.

6. The adsorbing device as claimed in claim 5, wherein said cover wall defines an annular groove housing said end portion both axially and radially loosely to define said vent.

7. The adsorbing device as claimed in claim 1, further including an annular member of said casing and a click-on fastener comprised of a plurality of projections on said cover wall, and a corresponding plurality of openings defined by said annular member.

8. The adsorbing device as claimed in claim 7, wherein said openings are sized to define a passage connecting said vent to the outside environment when said projections engage the openings and when said cover wall is connected to said casing.

9. The adsorbing device as claimed in claim 3, wherein said annular member is formed in one piece with said end portion and is molded.

10. The adsorbing device as claimed in claim 1, further including a grille (26) integrally formed with said elastic mechanism.

* * * * *